United States Patent
Meid et al.

(10) Patent No.: US 10,937,616 B2
(45) Date of Patent: Mar. 2, 2021

(54) CONTROL DEVICE FOR AN ELECTROMAGNETIC DRIVE OF A SWITCHGEAR

(71) Applicant: EATON INTELLIGENT POWER LIMITED, Dublin (IE)

(72) Inventors: Wolfgang Meid, Muelheim-Kaerlich (DE); Ingo Schaar, Bonn (DE)

(73) Assignee: EATON INTELLIGENT POWER LIMITED, Dublin (IE)

(*) Notice: Subject to any disclaimer, the term of this patent is extended or adjusted under 35 U.S.C. 154(b) by 371 days.

(21) Appl. No.: 16/067,833

(22) PCT Filed: Dec. 16, 2016

(86) PCT No.: PCT/EP2016/081594
§ 371 (c)(1),
(2) Date: Jul. 3, 2018

(87) PCT Pub. No.: WO2017/118558
PCT Pub. Date: Jul. 13, 2017

(65) Prior Publication Data
US 2019/0013169 A1    Jan. 10, 2019

(30) Foreign Application Priority Data
Jan. 5, 2016  (DE) ...................... 10 2016 100 188.0

(51) Int. Cl.
*H01H 47/22* (2006.01)
*H02H 1/06* (2006.01)

(52) U.S. Cl.
CPC .............. *H01H 47/22* (2013.01); *H02H 1/06* (2013.01)

(58) Field of Classification Search
CPC ................................. H01H 47/22; H02H 1/06
USPC ........................................................ 361/143
See application file for complete search history.

(56) References Cited

U.S. PATENT DOCUMENTS

| | | |
|---|---|---|
| 3,600,667 A | 8/1971 | Wynn |
| 4,502,152 A | 2/1985 | Sinclair |
| 4,611,162 A | 9/1986 | Erratico et al. |
| 5,258,701 A | 11/1993 | Pizzi et al. |
| 5,428,495 A | 6/1995 | Murphy et al. |
| 6,150,798 A * | 11/2000 | Ferry ........................ G05F 1/56 323/273 |
| 6,249,110 B1 | 6/2001 | Geyer et al. |
| 6,636,023 B1 | 10/2003 | Amin |
| 6,661,635 B1 | 12/2003 | Meid |
| 2004/0169422 A1 | 9/2004 | Eaton et al. |

(Continued)

FOREIGN PATENT DOCUMENTS

| | | |
|---|---|---|
| DE | 2007694 A1 | 9/1971 |
| DE | 2933029 A1 | 2/1980 |

(Continued)

*Primary Examiner* — Kevin J Comber
(74) *Attorney, Agent, or Firm* — Leydig, Voit & Mayer, Ltd.

(57) ABSTRACT

A control device for an electromagnetic drive of a switchgear includes a plurality of power supply units, each of which is configured to provide, in a specified input voltage range in each case, electrical power that is sufficient for operating the electromagnetic drive: The control device is configured to automatically control the use of the power supply units for operating the electromagnetic drive on the basis of an input voltage of the control device.

14 Claims, 2 Drawing Sheets

(56) References Cited

U.S. PATENT DOCUMENTS

| | | | |
|---|---|---|---|
| 2005/0068145 A1 | 3/2005 | Marquardt et al. | |
| 2010/0289603 A1 | 11/2010 | Meid | |
| 2014/0043872 A1 | 2/2014 | Meid | |
| 2014/0049114 A1* | 2/2014 | Chen | H01H 47/325 |
| | | | 307/75 |
| 2017/0092449 A1* | 3/2017 | Thornton | H01H 47/325 |

FOREIGN PATENT DOCUMENTS

| | | |
|---|---|---|
| DE | 3422135 A1 | 12/1984 |
| DE | 29518350 U1 | 3/1997 |
| DE | 19917204 A1 | 10/2000 |
| DE | 19935043 A1 | 2/2001 |
| DE | 112004001824 T5 | 7/2006 |
| DE | 102007031995 A1 | 1/2009 |
| DE | 102010018754 A1 | 11/2011 |
| DE | 102010031333 A1 | 1/2012 |
| EP | 0590936 A2 | 4/1994 |

* cited by examiner

CONTROL DEVICE FOR AN ELECTROMAGNETIC DRIVE OF A SWITCHGEAR

CROSS-REFERENCE TO RELATED APPLICATIONS

This application is a U.S. National Stage Application under 35 U.S.C. § 371 of International Application No. PCT/EP2016/081594 filed on Dec. 16, 2016, and claims benefit to German Patent Application No. DE 10 2016 100 188.0 filed on Jan. 5, 2016. The International Application was published in German on Jul. 13, 2017 as WO 2017/118558 A1 under PCT Article 21(2).

FIELD

The present invention relates to a control device for an electromagnetic drive of a switchgear, in particular a contactor, that is intended for supplying power to the drive, and the invention further relates to a switchgear comprising a control device of this kind.

BACKGROUND

Switchgear, such as contactors, have been designed for specific, pre-determined and relatively small control voltage ranges. For example, electronically actuated contactors that are currently available can cover only a limited control voltage range of for example 110 volts to 240 volts AC/DC voltage. It is therefore necessary to decide what control voltage is to be used prior to installing contactors. For service engineers, this means that it is necessary to keep a supply of different switchgear or contactors. In addition, mobile equipment cannot be easily operated on every electrical network. Switchgear or contactors that have as large an input or control voltage range as possible are therefore desirable. For a switchgear of this kind, the control device and a power supply unit contained therein would have to be designed for a correspondingly large input or control voltage range.

A problem in the development of power supply units having a wide input voltage range together with a high output power is that of finding a suitable switching controller that can handle a wide input voltage range of, for example Ucmin=24V to Ucmax=250V AC/DC voltage. In addition to the rated input voltage range, the required tolerances must also be taken into account. As a result, the input voltage range that has to be handled effectively increases from approximately Umin=12 V (50% Ucmin) to Umax=300 V (120% Ucmax). However, conventional switching controllers only provide the required high output powers in a smaller range.

SUMMARY

An embodiment provides a control device for an electromagnetic drive of a switchgear that includes a plurality of power supply units, each of which is configured to provide, in a specified input voltage range in each case, electrical power that is sufficient for operating the electromagnetic drive. The control device is configured to automatically control the use of the power supply units for operating the electromagnetic drive on the basis of an input voltage of the control device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
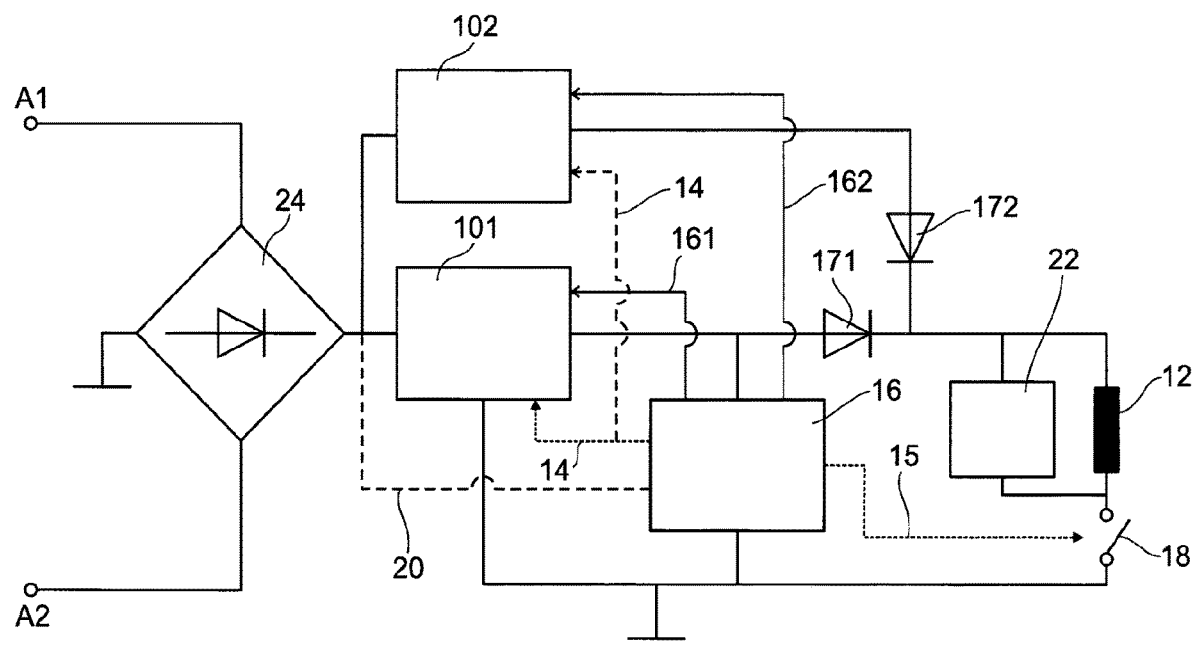
FIG. 1 is a functional block diagram of a first embodiment of a control device for an electromagnetic drive of a switchgear having two power supply units and a control unit according to the present invention.

Embodiments of the present invention provide a control device for an electromagnetic drive of a switchgear, for example a contactor, that is intended for supplying power to the drive, and embodiments of the invention further provide a switchgear having a control device of this kind.

Embodiments of the present invention provide a control device for an electromagnetic drive of a switchgear, in particular a contactor, and a switchgear, that have as large an input or control voltage range as possible.

Embodiments of the present invention equip a control device for an electromagnetic drive of a switchgear with a plurality of power supply units, each of which can provide, in a specified input voltage range in each case, electrical power that is sufficient for operating the electromagnetic drive, and the control device can automatically control the use of the power supply units, i.e. which of the power supply units are used to operate the drive, on the basis of an input voltage of the control device. In this case, operating the electromagnetic drive includes pick-up and/or holding operation of the drive. The invention therefore makes it possible to activate, on the basis of the input voltage applied to the control device, the power supply units that can provide electrical power that is sufficient for operating the electromagnetic drive in the input voltage range of the applied input voltage. This can provide a control device that can always provide power that is high enough for operating an electromagnetic switchgear drive over a wide input voltage range.

An embodiment of the invention relates to a control device for an electromagnetic drive of a switchgear having a plurality of power supply units, each of which is designed to provide, in a specified input voltage range in each case, electrical power that is sufficient for operating the electromagnetic drive, and the control device being designed to automatically control the use of the power supply units for operating the electromagnetic drive, on the basis of an input voltage of the control device.

The control device may include a control unit that is designed to control the use of the power supply units for operating the electromagnetic drive, on the basis of a measuring voltage bled off from the input voltage of the control device. Alternatively or in addition, at least one of the power supply units may be designed to be automatically self-activating or self-deactivating, on the basis of the input voltage of the control device.

In particular, the control unit may be designed to in each case generate a turn-on and turn-off signal for each of the power supply units such that one or more of the power supply units are activated or deactivated by means of the corresponding turn-on and turn-off signals, on the basis of the measuring voltage, in order to operate the electromagnetic drive.

A first power supply unit that is designed to provide, in a first specified input voltage range, electrical power that is sufficient for operating the electromagnetic drive, and a second power supply unit that is designed to provide, in a second specified input voltage range below a specified voltage value, electrical power that is sufficient for operating the electromagnetic drive, may be provided in the control device, and the control unit may be designed to generate a first turn-on and turn-off signal for the first power supply unit such that the first power supply unit is activated when the measuring voltage is in the first specified input voltage range, and to generate a second turn-on and turn-off signal for the second power supply unit such that the second power supply unit is activated when the measuring voltage is in the second specified input voltage range.

The control unit may further be designed to generate a control signal for at least one of the power supply units such that the at least one power supply unit generates a pick-up DC voltage for the drive when at least one pick-up condition is met, and generates a holding DC voltage for the drive when at least one holding condition is met.

At least one of the power supply units may be a switched-mode power supply unit. Linear power supply units may also be used as power supply units.

For example, at least one of the power supply units may be a switched-mode power supply unit that is designed for an input voltage range of from approximately 24 volts to approximately 240 volts rated voltage. A switched-mode power supply unit of this kind may be provided for example for generating a holding DC voltage over an input voltage range of from approximately 24 volts (−50%) to approximately 240 volts (+20%). Since the power requirements in holding operation of a switchgear drive are lower than in pick-up operation, a correspondingly sized switched-mode power supply unit can be used for this purpose. It is then possible for example to use a linear power supply unit for the pick-up operation, which unit can meet the power requirements for pick-up operation.

In order to decouple the power supply unit outputs, a diode can in each case be connected between the outputs of the power supply units and a coil of the drive. This prevents the power supply units from being able to mutually influence or interfere with one another.

At least one of the power supply units may be designed to generate a voltage that is suitable for supplying power to the control device. For example, as described above, one of the power supply units may be a switched-mode power supply unit that generates a supply voltage for the control device, for example 5 volts, for the entire input voltage range for which the switchgear, at which the control device is used.

A further embodiment of the invention relates to a switchgear, in particular a contactor, having a switch drive that has a coil, and a control device according to the invention and as described herein for controlling the supply of power to the coil. The switchgear may also have a rectifier for generating a rectified output voltage from an AC voltage in a specified input voltage range, the output voltage being fed to the power supply unit of the control device.

The control unit of the control device may have a microprocessor or microcontroller that is configured by a program stored in a memory to control the use of the power supply units for operating the electromagnetic drive, depending on a measuring voltage bled off from an input voltage of the control device. Alternatively or in addition, at least one of the power supply units may have an activating circuit that activates the at least one power supply unit when an input voltage of the control device is in a specified voltage range. The activating circuit may for example be designed as an analogue circuit that is integrated in the at least one power supply unit.

Further advantages and possible uses of the present invention are found in the following description in conjunction with the embodiments shown in the drawings.

In the following description, like, functionally like and functionally associated elements may be provided with the same reference signs. Absolute values are only stated in the following by way of example and should not be understood to have a limiting effect on the invention.

Figure 2:
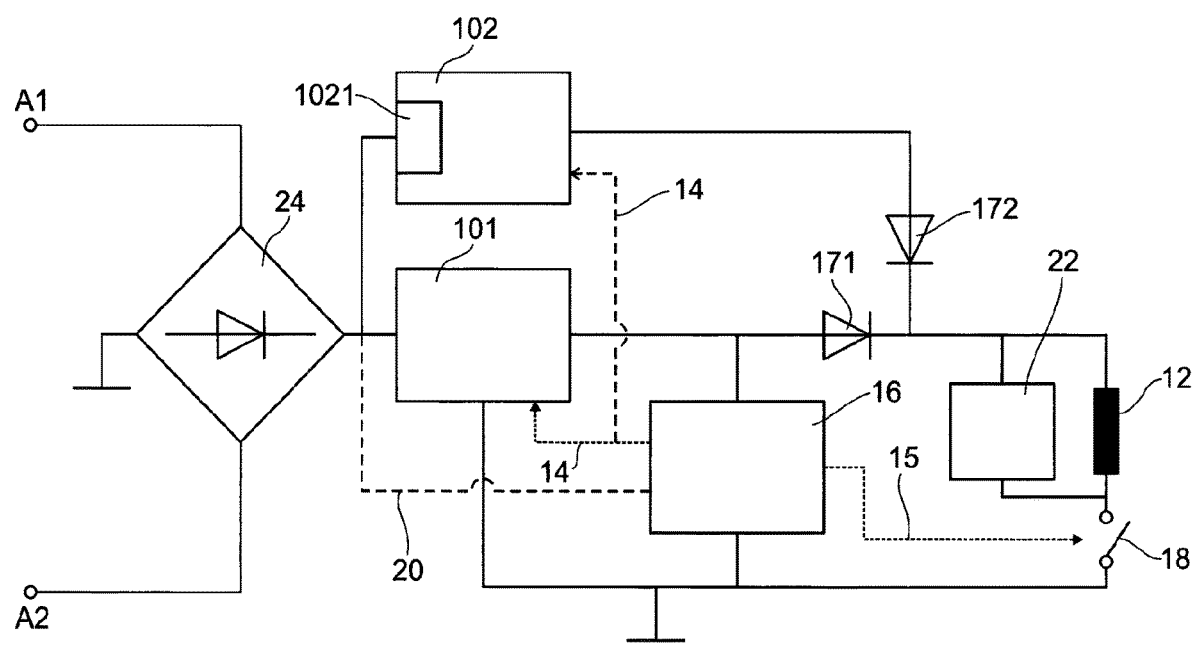
FIG. 2 is a functional block diagram of a second embodiment of a control device for an electromagnetic drive of a switchgear having two power supply units according to the present invention.

FIG. 1 and FIG. 2 are functional block diagrams of a control device or control electronics according to the invention that is designed in principle for a wide input voltage range, for example of from approximately 24 volts to approximately 240 volts, and can be implemented in a relatively compact manner on a circuit board. The control device is suitable for example for integration in a switchgear such as a contactor. The control device makes it possible to generate the energy for pick-up and holding operation of an electromagnetic switchgear drive over a wide input voltage range that may include a plurality of conventional input voltage ranges for switchgear, such as 24 volts-48 volts, 48 volts-110 volts, 110 volts-240 volts AC voltage/DC voltage, using two or even more power supply units, in particular without the use of PWM (on the drive), as a result of which the EMC behaviour can be improved.

The control device shown in FIG. 1 includes a first power supply unit 101, in particular a switched-mode power supply unit, a second power supply unit 102, in particular a linear power supply unit, a control unit 16, for example implemented by a microcontroller including a memory, a quick de-energising unit 22, a controllable switch 18, and two diodes 171, 172 for decoupling the power supply unit outputs. Strictly speaking, the rectifier 24 shown in FIG. 1 is not part of the control device, but can nonetheless be provided on a circuit board of the control device. All voltages and signals of the control device relate to a reference potential (e.g. earth).

The rectifier 24 is powered by a voltage applied at the terminals A1 and A2, for example an AC voltage (within or outside the conventional 50 Hz or 60 Hz), or a DC voltage. The output voltage generated by the rectifier 24 from the voltage is fed to the first and the second power supply unit 101 and 102, respectively, as the input voltage.

The first power supply unit 101 is in particular designed as a switched-mode power supply unit for a wide input voltage range, for example of from approximately 24 volts to approximately 240 volts, and generates an output voltage and an output current from an input voltage in the input voltage range, which output voltage and output current are of such a magnitude as to provide electrical power that is sufficient for operation of the control unit 16 and for pick-up operation and holding operation of a coil 12 of an electromagnetic drive of a switchgear (not shown).

The second power supply unit 102 is in particular designed as a linear power supply unit for a smaller input voltage range than the first power supply unit 101, for example of from approximately 24 volts to approximately 30 volts, and generates an output voltage and an output current from an input voltage in the input voltage range, which output voltage and output current are of such a magnitude as to provide electrical power that is sufficient for pick-up operation of the coil 12 of the electromagnetic drive of the switchgear. The second power supply unit 102 is intended for assisting the first power supply unit 101, since the electrical power required for pick-up operation is higher than the power required for holding operation, and a switched-mode power supply unit generally cannot provide a power of this kind over a wide input voltage range, for example of from approximately 24 volts to approximately 240 volts.

The diodes 171 and 172 are connected between the outputs of the power supply units 101 and 102 such that the two power supply unit outputs are decoupled and the power supply units 101 and 102 cannot influence and interfere with one another, i.e. for example current cannot flow from the output of one power supply unit into the output of the other power supply unit. The two diodes 171 and 172 in principle provide a logical disjunction of the two power supply unit outputs.

The quick de-energising unit 22 is connected in parallel with the coil 12. The controllable switch 18, for example a switching transistor having corresponding current load capacity and suitability for the voltages that arise, is connected between the coil 12 and earth.

The control unit 16 controls the use of the power supply units 101 and 102 in the following manner:

In order to start the control device and to initiate switching of the switchgear by means of the control device, a voltage in the specified, wide input voltage range, for example from approximately 24 volts to approximately 240 volts, is applied at the terminals A1 and A2. The output voltage generated by the rectifier 24 from the applied voltage is fed to the two power supply units 101 and 102 in parallel, on the input side. The first power supply unit 101 that is activated, i.e. switched on, by default generates from the fed-in input voltage an output DC voltage that is sufficient for supplying power to the control unit 16. As soon as the output DC voltage has been generated, the control unit 16 begins the control process, in particular by a microcontroller that implements the control unit 16 starting to execute firmware stored in the memory thereof.

As soon as the control unit 16 is operating, it measures a measuring voltage 20 bled off from the input voltage of the power supply units 101 and 102 that is generated by the rectifier 24. For example, a voltage divider may be used to bleed off the measuring voltage 20 from the voltage generated by the rectifier 24 which, depending on the input voltage, may have very high values which are possibly too high to be handled directly by the control unit 16.

The control unit 16 controls, on the basis of the measuring voltage 20, which power supply units are used for generating the voltage and current supply for the coil 12 of the drive. Moreover, the control unit 16 controls the connection or disconnection of the coil 12 of the drive to or from the voltage supply of the power supply unit or units 101, 102, on the basis of the measuring voltage 20. For this purpose, the control unit 16 generates a first turn-on and turn-off signal 161 for activating or deactivating the first power supply unit 101, a second turn-on and turn-off signal 162 for activating or deactivating the second power supply unit 102, a control signal 14 for switching the first and second power supply unit 101 and 102, respectively, such that either a pick-up DC voltage or a holding DC voltage that is lower than the pick-up DC voltage is generated and output, as the output DC voltage, for the switching drive of the switchgear, and a second control signal 15 in order to connect the coil 12, by means of the controllable switch 18, into the supply path of the first and/or second power supply unit 101 and 102, respectively. When the control unit 16 is started, the first turn-on and turn-off signal 161 is active, and therefore the first power supply unit 101 that is activated by default remains active and the output voltage remains on and ensures the supply of power to the control unit 16, the second turn-on and turn-off signal 162 is inactive, and therefore the second power supply unit 102 is inactive or the output voltage thereof is off, the control signal 14 is a state such that the power supply units 101 and 102 generate a holding DC voltage, and the second control signal 15 is in a state in which the controllable switch 18 is open.

The control of the use of the power supply units 101 and 102 will now be explained with reference to the following example: the first power supply unit 101 is designed as a switched-mode power supply unit for a wide input voltage range of from approximately 24 volts to approximately 240 volts and can provide, above an input voltage range of >30 volts, electrical power that is sufficient for pick-up and holding operation of the electromagnetic drive. The second power supply unit 102 is designed as a linear power supply unit for an input voltage range of from approximately 24 volts to approximately 30 volts and can provide, in this input voltage range, a power that is sufficient for pick-up operation of the electromagnetic drive.

The control unit 16 then monitors the measuring voltage 20 until the voltage reaches a stable, almost constant value, and then compares the almost constant value that has been reached with a specified threshold value that corresponds to an input voltage of approximately 30 volts. If the comparison reveals that the value is below the threshold value, the control unit 16 generates the second turn-on and turn-off signal 162 such that the second power supply unit 102 is activated. If the value is above the threshold value, the control unit 16 leaves the second turn-on and turn-off signal 162 set such that the second power supply unit 102 remains deactivated.

If the switch-on conditions for the switchgear are in the target range (e.g. >85% 24V), the control unit 16 now generates the second control signal 15 such that the controllable switch 18 is closed, as a result of which the coil 12 is connected to earth and can thus be supplied by the pick-up DC voltage of the power supply unit 101 and/or 102, such that a corresponding pick-up current flows through the coil 12 and the drive of the switchgear is moved so as to close the switching contacts.

A timer is started in the control unit 16, which timer runs for a specified time after the control signal 15 has been generated, following closure of the switch 18. In this case, the specified time is determined depending on the switching drive and the duration so as to include the time until the switching contacts of the switchgear are closed (typically corresponds approximately to the pick-up time of the switching drive).

When the timer, and thus the time specified thereby, have run out, a holding condition is met.

If the second power supply unit 102 was activated during the pick-up procedure, the control unit 16 generates the second turn-on and turn-off signal 162 such that the second power supply unit 102 is deactivated. Furthermore, the control unit 16 generates the control signal 14 such that the control signal 14 switches the first power supply unit 101 into a mode in which it now generates and outputs, as the output DC voltage, a holding DC voltage for the switching drive of the switchgear that is lower than the pick-up DC voltage. In practice, in this case the power supply unit 10 reduces its output DC voltage to the holding DC voltage and now outputs the holding DC voltage for as long as a voltage in the specified input voltage range is applied to the terminals A1 and A2 and the switching contacts of the switchgear are intended to remain closed.

Depending on the electromagnetic drive and the parameters thereof, the second power supply unit 102 can also remain activated during the holding procedure (for example if the drive requires electrical power in holding operation that the first power supply unit 101 cannot provide). In this case, the control signal 14 can switch both the second power supply unit 102 and the first power supply unit 101 into the mode for generating a holding DC voltage.

If the voltage at the terminals A1 and A2 is turned off or falls below a specified minimum voltage, which the control unit 16 can detect from the measuring voltage 20, the control unit 16 turns off the switching drive by means of generating and outputting the second control signal 15 such that the controllable switch 18 is opened. After the switch 18 is opened, the quick de-energising unit 22 is automatically activated, by means of which the energy stored in the coil 12 is discharged.

FIG. 2 is a functional block diagram of an embodiment of the control device in which it is not the control unit 16 of the two power supply units 101 and 102 that is activated or turned off on the basis of the measured input voltage, but instead the second power supply unit 102 is automatically activated or deactivated on the basis of the input voltage. For this purpose, the second power supply unit 102 is integrated in an analogue circuit 1021 that activates the second power supply unit 102, on the basis of the voltage applied to the second power supply unit 102 at the input side, i.e. the input voltage, such that the power supply unit generates an output voltage. The analogue circuit 1021 may, for example, activate the second power supply unit 102 at an input voltage of <30 volts and deactivate the power supply unit as soon as the input voltage is >30 volts. In this case, the first power supply unit 101 is always activated and is switched from pick-up mode to holding mode only by means of the control signal 14. If both power supply units 101 and 102 are activated, for example in the case of an input voltage of <30 volts, the relevant output voltages of the power supply units 101 and 102 are switched on or off by means of a disjunction achieved by the two diodes 171 and 172. In this case, the power supply unit that provides the higher output voltage at that time, depending on the input voltage, delivers the voltage for the pick-up procedure of the switchgear for example.

The present invention allows for almost any desired wiring of a plurality of power supply units in order to be able to provide electrical power, required for operation of an electromagnetic drive of a switchgear, over as large as possible an input voltage range of in particular approximately 24 volts to approximately 240 volts AC/DC voltage. This provides the possibility of implementing a multiple-voltage switchgear. Further advantages of the present invention are simplification of the circuit of the control device, and a robustness that is generally associated therewith, possible minimisation of the circuit variants, and improvement of the EMC behaviour. Further advantages of the invention can be considered to be the fact that the coil types of the electromagnetic drive of a switchgear can be reduced, since it is no longer necessary to use a separate coil for each input voltage range, but instead it is possible to use one coil for a plurality of input voltage variants, the number of components can be reduced, and a more compact structure is possible which leads to smaller air gaps and leakage distances and thus improved EMC behaviour, and also requires less installation space.

As described above, embodiments of the present invention provide a control device for an electromagnetic drive of a switchgear, that includes a plurality of network parts (101, 102), each of which is configured to provide an electrical power sufficient for operating the electromagnetic drive (12) in a respective predetermined input voltage range (12). The control device is configured to automatically control the use of the network parts (101, 102) for operating the electromagnetic drive (12), based on an input voltage.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A control device for an electromagnetic drive of a switchgear, the control device comprising:
   a first power supply unit, of a plurality of power supply units, configured to provide, in a first specified input voltage range, electrical power that is sufficient for operating the electromagnetic drive, and
   a second power supply unit, of the power supply units, configured to provide, in a second specified input voltage range below a specified voltage value, electrical power that is sufficient for operating the electromagnetic drive,
   wherein the control device is configured to automatically control the use of the power supply units for operating the electromagnetic drive on the basis of an input voltage of the control device such that, in a case where the input voltage is both in the first specified input voltage range and in the second specified input voltage range, the control device is configured to activate both the first power supply unit and the second power supply unit.

2. The control device according to claim 1, wherein
   the control device comprises a control unit that is configured to control the use of the power supply units for operating the electromagnetic drive on the basis of a measuring voltage bled off from the input voltage of the control device, with reference to a ground voltage, and/or at least one of the power supply units is configured to be automatically self-activating or self-deactivating on the basis of the input voltage of the control device.

3. The control device according to claim 2, wherein the control unit is configured to in each case generate a turn-on and a turn-off signal for each of the power supply units such that one or more of the power supply units are activated or deactivated by the corresponding turn-on and turn-off signals on the basis of the measuring voltage in order to operate the electromagnetic drive.

4. The control device according to claim 2, comprising:
wherein the control unit is configured to generate a first turn-on and a first turn-off signal for the first power supply unit such that the first power supply unit is activated when the measuring voltage is in the first specified input voltage range, and to generate a second turn-on and a second turn-off signal for the second power supply unit such that the second power supply unit is activated when the measuring voltage is in the second specified input voltage range.

5. The control device according to claim 2, wherein the control unit is configured to generate a control signal for at least one of the power supply units such that the at least one power supply unit generates a pick-up DC voltage for the drive based upon at least one pick-up condition being met, and generates a holding DC voltage for the drive based upon at least one holding condition being met.

6. The control device according to claim 1, wherein the first power supply unit is a switched-mode power supply unit that is configured for first specified input voltage range of from approximately 24 volts to approximately 240 volts.

7. The control device according to claim 1, wherein, in order to decouple the power supply unit outputs, a diode is in each case connected between the outputs of the power supply units and a coil of the electromagnetic drive.

8. The control device according to claim 1, wherein at least one of the power supply units is configured to generate a voltage that is suitable for supplying power to the control device.

9. A switchgear comprising:
a switching drive that comprises a coil; and
the control device according to claim 1 for controlling a power supply of the coil.

10. The switchgear according to claim 9, wherein
a control unit of the control device comprises a microprocessor or microcontroller that is configured by a program stored in a memory to control the use of the power supply units for operating the electromagnetic drive on the basis of a measuring voltage bled off from an input voltage of the control device, and/or
at least one of the power supply units comprises an activating circuit that activates the at least one power supply unit when an input voltage of the control device is in a specified input voltage range.

11. The switchgear according to claim 9, wherein the switchgear is a contactor.

12. The control device according to claim 6, wherein the second power unit is a linear power supply unit that is configured for the second specified input voltage range from approximately 24 volts to approximately 30 volts.

13. The control device according to claim 1,
wherein the first power supply unit is configured to provide, in a part of the first specified input voltage range that is above the specified voltage value, electrical power that is sufficient for operating the electromagnetic drive in both a pick-up operation and a holding operation, and
wherein the second power supply unit is configured to provide, in the second specified input voltage range below the specified voltage value, electrical power that is sufficient for operating the electromagnetic drive in the pick-up operation.

14. The control device according to claim 13, the control device further comprising a control unit,
wherein the control unit is configured to control the use of the second power supply unit for operating the electromagnetic drive on the basis of a measuring voltage bled off from the input voltage of the control device, with reference to a ground voltage,
wherein the control unit is configured to generate a turn-on signal for the second power supply to activate the second power supply on the basis of the measuring voltage being determined to correspond to the case where the input voltage is in the second specified input voltage range below the specified voltage value,
wherein the control unit is configured to generate, in a case where switch-on conditions are met, a control signal to close a controllable switch to supply coil power to a coil of the electromagnetic drive,
wherein, in a case where the second power supply and the controllable switch are activated, the coil power comprises power from the second power supply, and
wherein the control unit is configured to generate a turn-off signal for the second power supply unit to deactivate the activated second power supply unit after a specified time after the control signal is generated.

* * * * *